United States Patent [19]
Kitagawa et al.

[11] Patent Number: 5,802,803
[45] Date of Patent: Sep. 8, 1998

[54] CASE PACKER

[75] Inventors: Kazumi Kitagawa; Kazuhiro Takaoka, both of Shiga, Japan

[73] Assignee: Ishida Co., Ltd., Japan

[21] Appl. No.: 845,983

[22] Filed: May 1, 1997

[30] Foreign Application Priority Data

May 8, 1996 [JP] Japan ................................. 8-139479

[51] Int. Cl.⁶ .............................. B65B 5/10; B65B 35/46; B65B 57/14
[52] U.S. Cl. .................................... 53/54; 53/504; 53/543
[58] Field of Search ................................ 53/54, 504, 502, 53/52, 543, 531, 251; 492/36, 30; 198/631.1, 572, 370.1, 369.6, 418; 209/698, 586, 923, 919

[56] References Cited

U.S. PATENT DOCUMENTS

| | | |
|---|---|---|
| 3,782,527 | 1/1974 | Petershack . |
| 4,134,502 | 1/1979 | Seragnoli ................................. 53/54 X |
| 5,101,609 | 4/1992 | Cook ........................................ 53/54 X |
| 5,251,422 | 10/1993 | Goodman et al. .................... 53/543 X |
| 5,406,770 | 4/1995 | Fikacek ....................................... 53/54 |

FOREIGN PATENT DOCUMENTS

| | | |
|---|---|---|
| 2547899 | 10/1975 | Germany . |
| 2818425 | 4/1978 | Germany . |
| 2180813 | 9/1984 | United Kingdom . |

*Primary Examiner*—James F. Coan
*Attorney, Agent, or Firm*—Majestic, Parsons, Siebert & Hsue P.C.

[57] ABSTRACT

A case packer has an inspection unit, a packing unit and a sorting unit. The inspection unit is disposed on the upstream side of a path of transportation for transporting packaged products and inspects conditions of the products being transported on the path and thereby distinguishes defective products from normal products. The packing unit is disposed on the downstream side and packs a container simultaneously with products delivered to it in a plurality of rows. The sorting unit is disposed between the inspection unit and the packing unit and discharges the defective products away from the normal path of transportation but arranges the normal products in the plurality of rows. The sorting unit uses quasi-circular members with a straight edge. They are rotatable in a plane perpendicular to the path in both directions from a retracted position at which they do not protrude into the transportation path of the products and serve to discharge each of defective products by rotating in one direction. The normal products are arranged in two rows as these quasi-circular members either remain in their retracted positions or rotate in the opposite direction to push the product transversely.

8 Claims, 8 Drawing Sheets

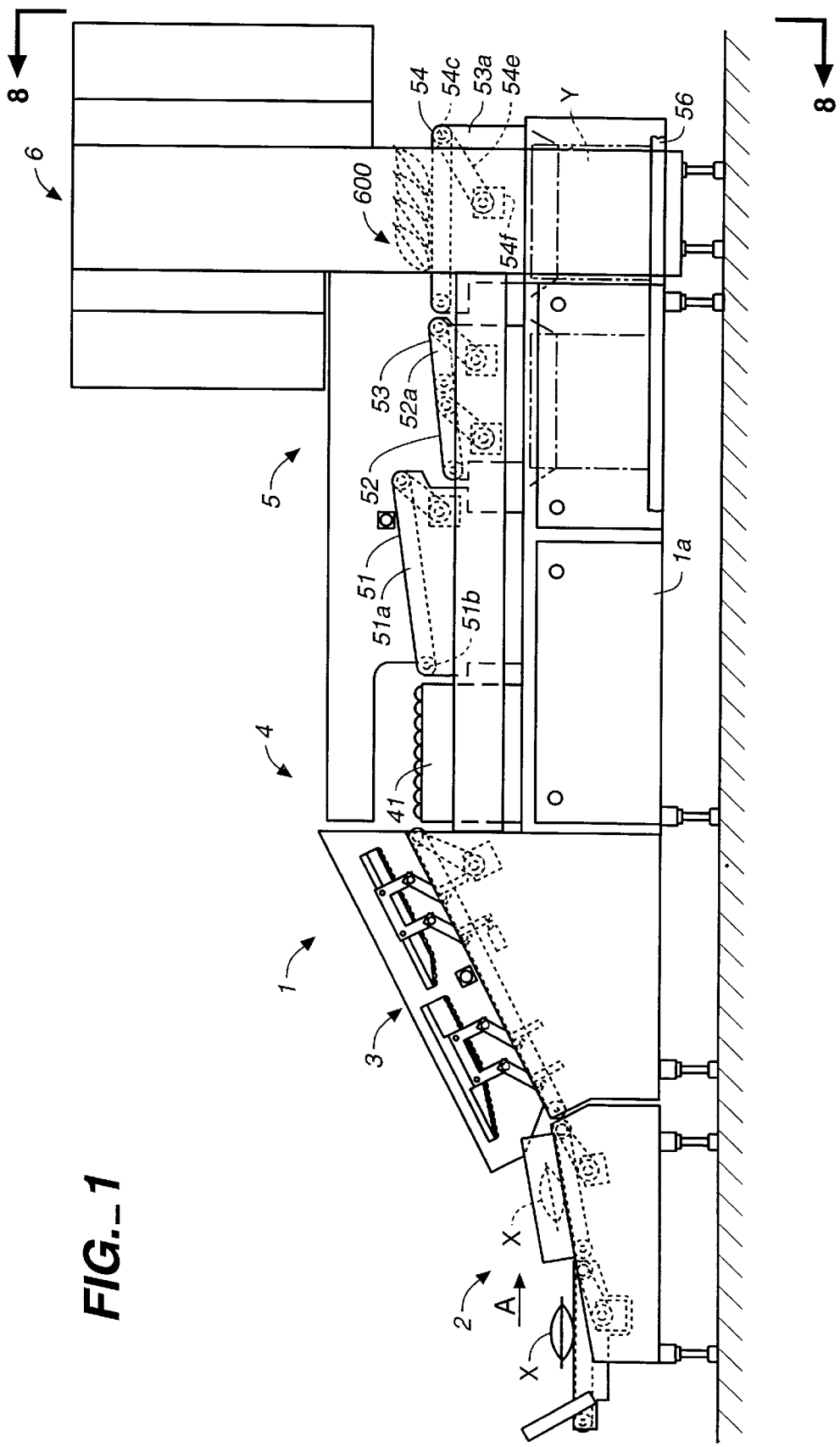
FIG._1

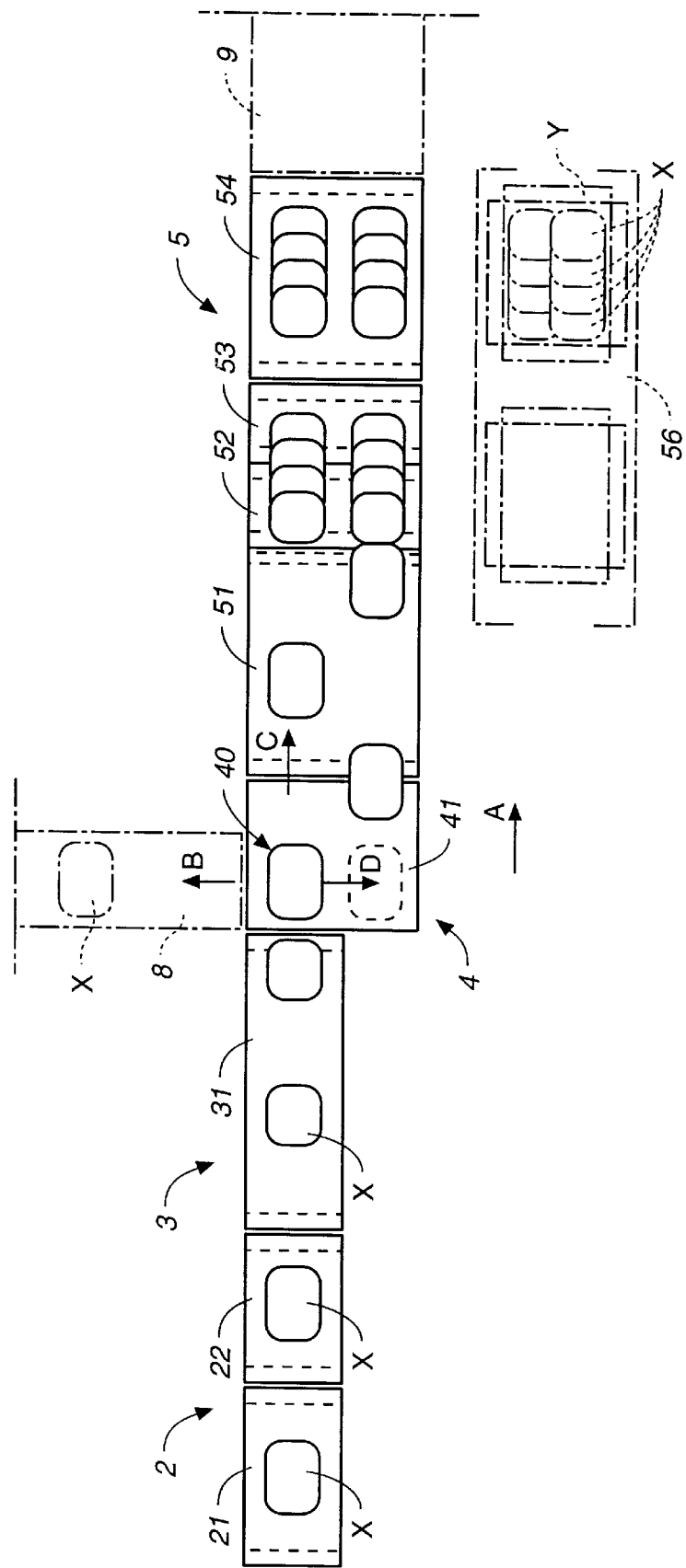
FIG._2

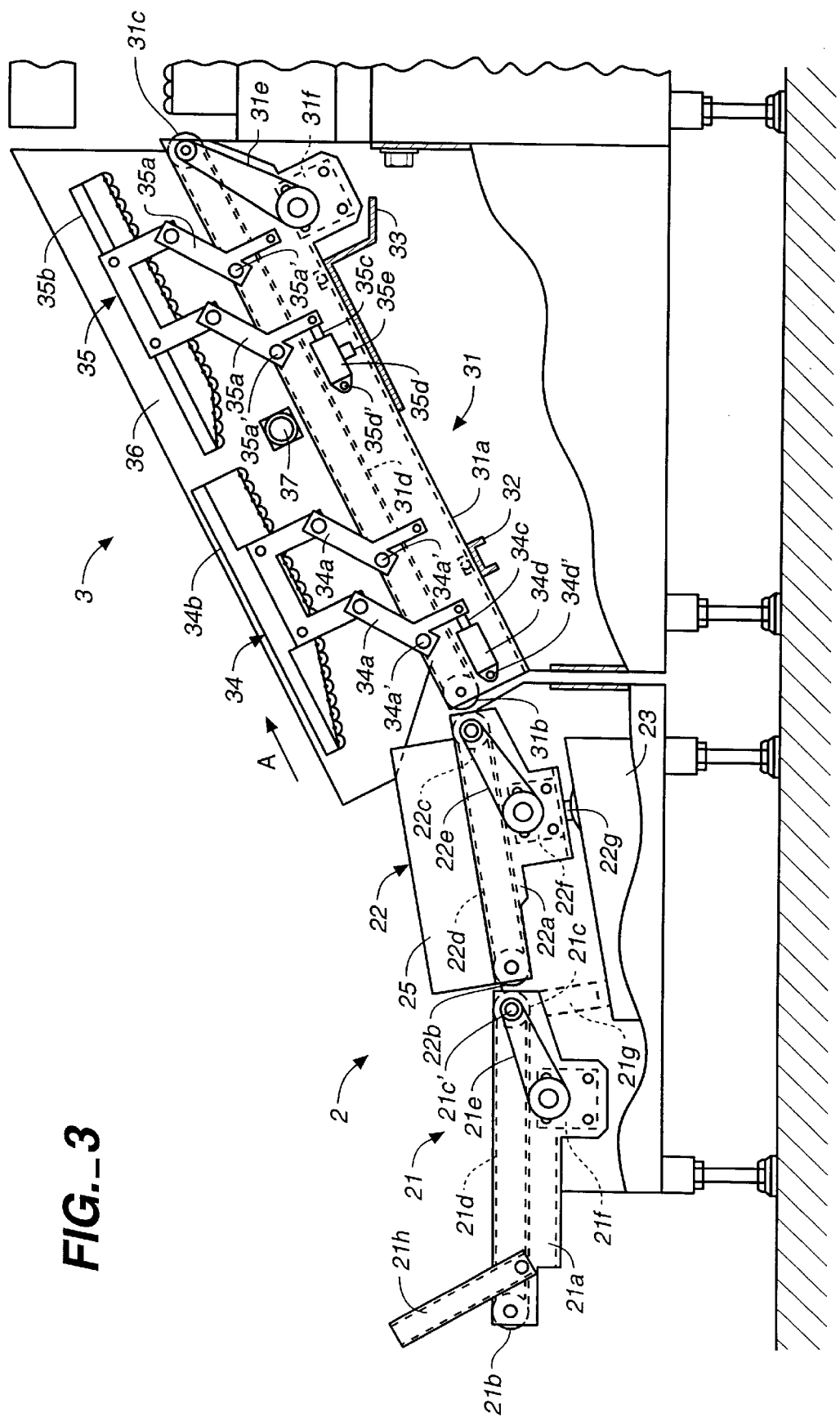
FIG._3

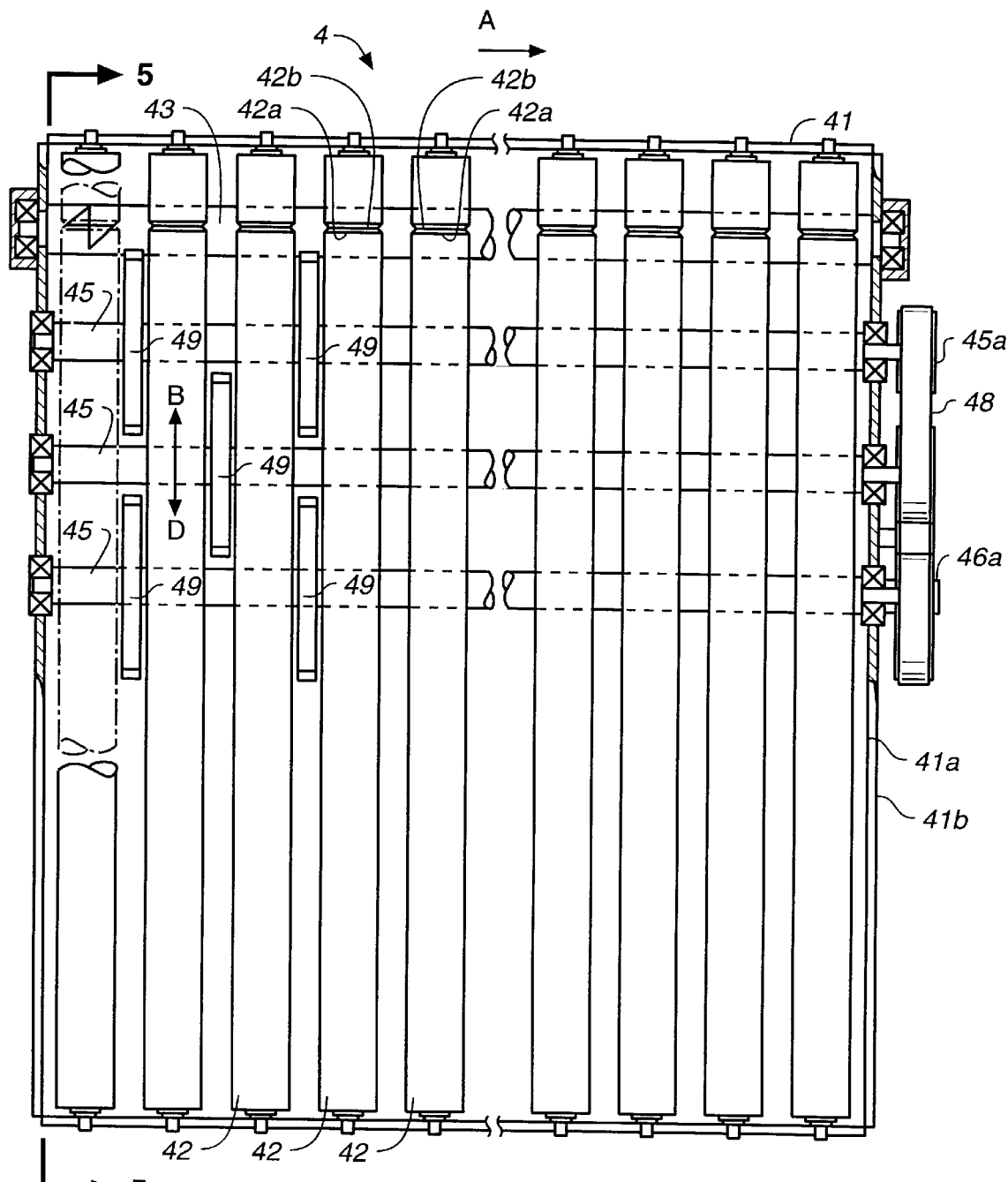
FIG._4

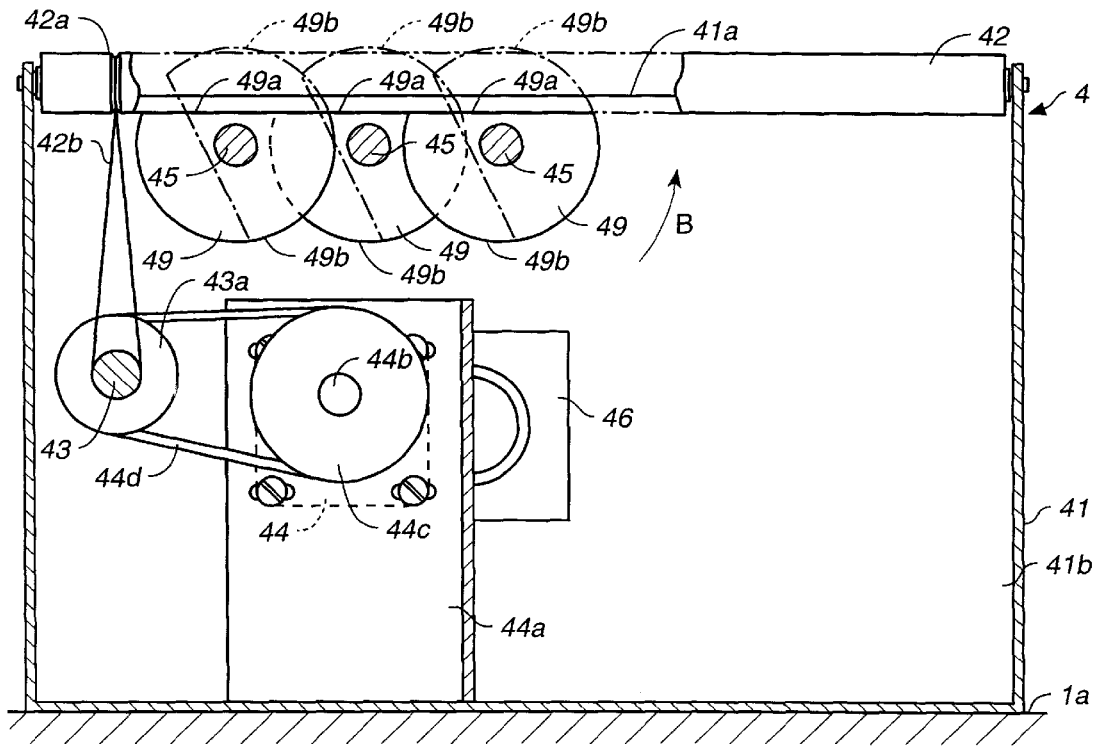
FIG._5
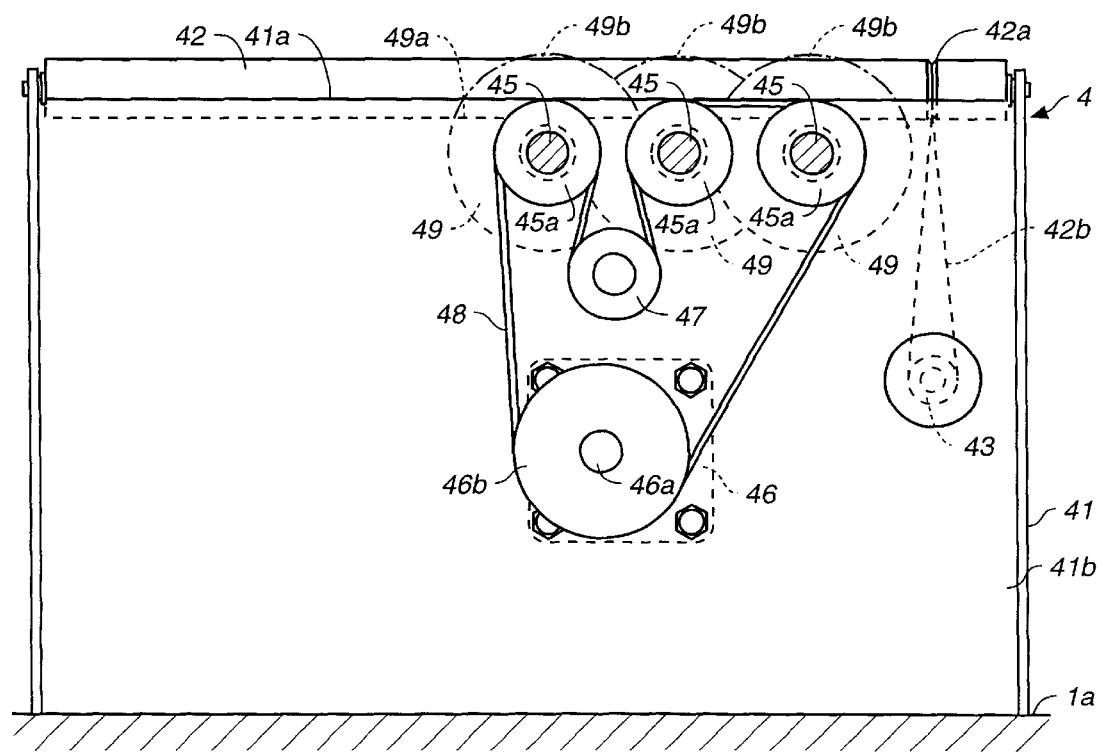
FIG._6

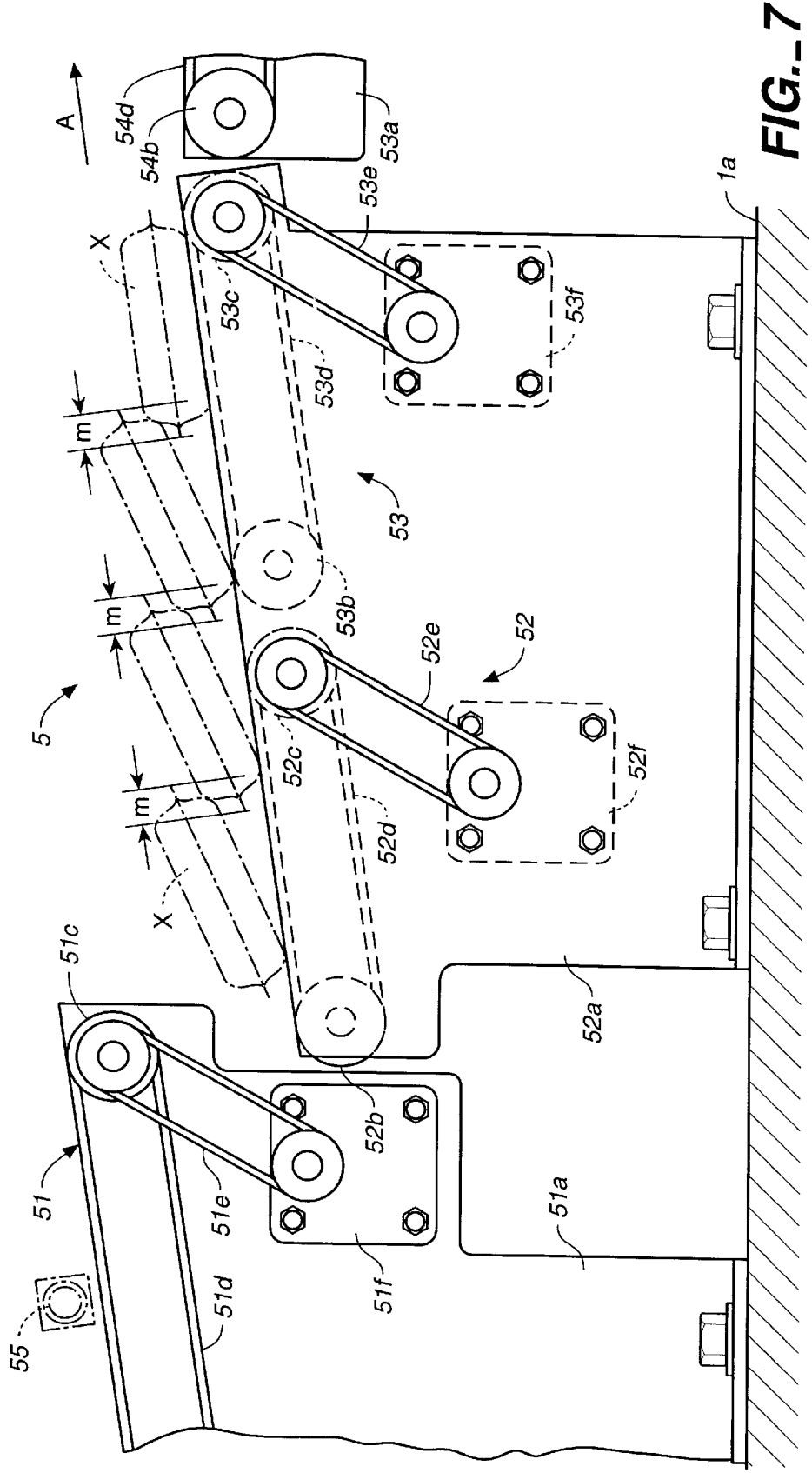

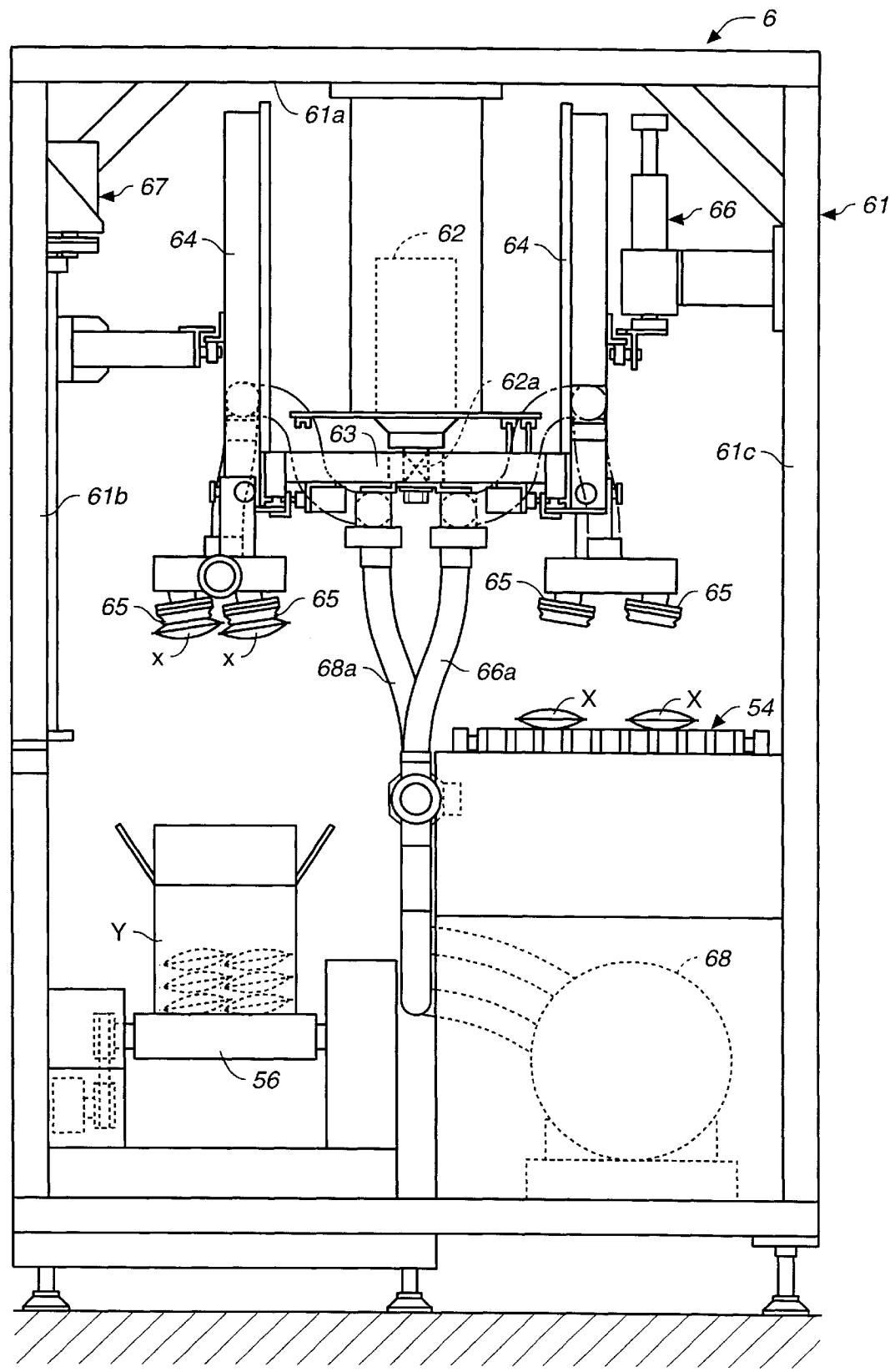
FIG._8

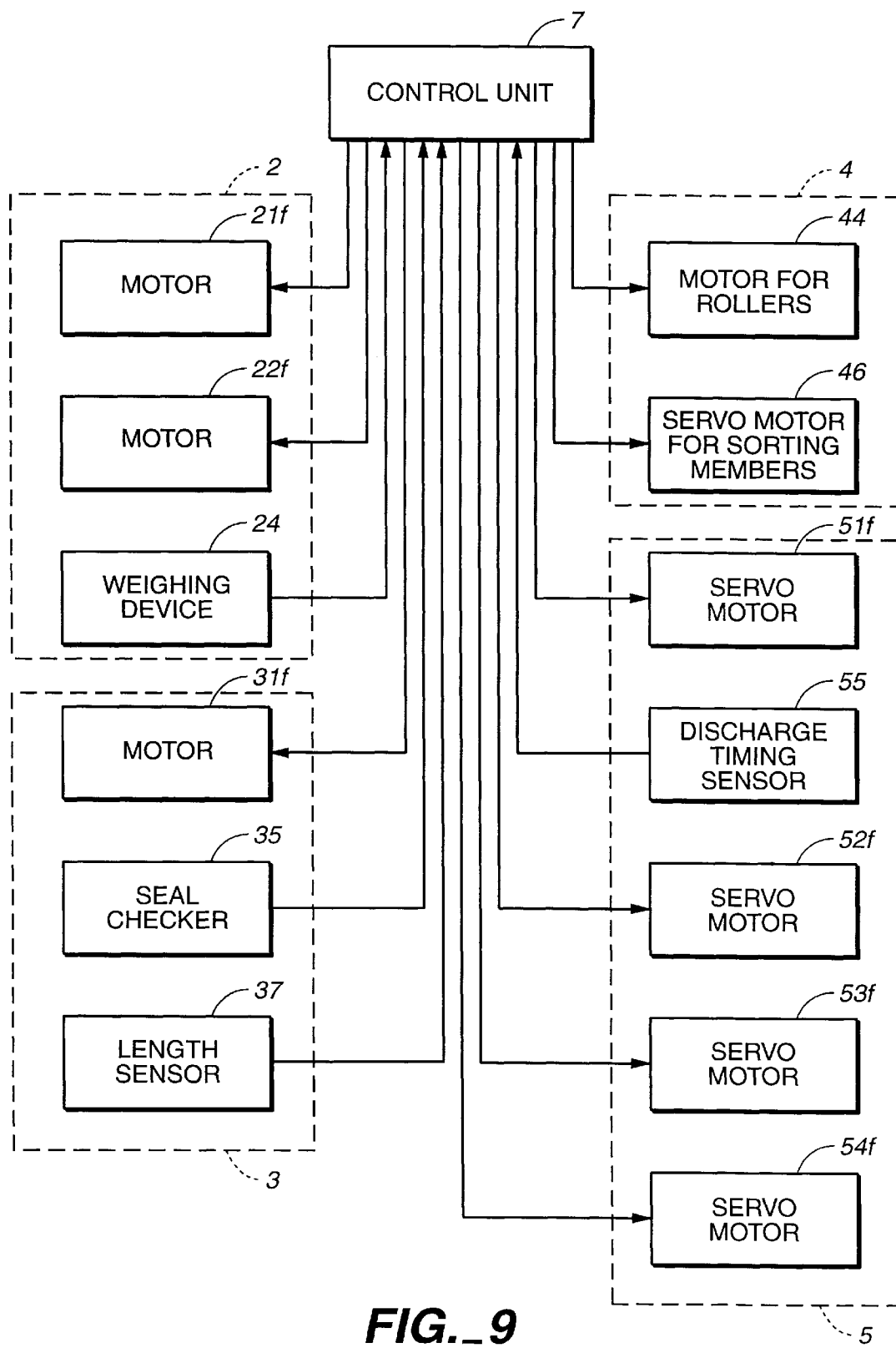
FIG._9

CASE PACKER

BACKGROUND OF THE INVENTION

This invention relates to a case packer, or an apparatus for sequentially depositing articles such as packaged products inside a case, or a container such as a cardboard box.

Products such as potato chips, already weighed and sealed in bags by means of a bag maker-packaging machine, are shipped to the market in containers such as cardboard boxes, each containing a specified number of these bags. Japanese Patent Publication Tokkai 6-263106, for example, disclosed a case packer which may be used for such a purpose, using conveyors to sequentially transport packaged products supplied from a bag maker-packaging machine and a packing mechanism for automatically arranging these packaged products inside a given container such as a cardboard box.

Such a case packer is usually provided with a seal checker for detecting a defectively sealed condition, a weight checker for checking the weight and a bag length checker for checking the length of each product supplied from a bag maker-packaging machine, disposed on the upstream side on the transportation path of the packaged products such that products which do not pass any one of the tests by these checking means can be discharged from their regular path of transportation by means of a discharging device.

As for the packing mechanism, it has been known to use a holder member which is freely movable between a starting position above where the packaged products are brought in and a delivery position above where the container is placed to be filled, having a suction pad on its lower surface for sucking up and releasing products. Such a holder member may be moved back and forth between its starting and delivery positions and moved up and down at each of these positions to pack the delivered products sequentially in the container. It has also been known to provide two suction pads next to each other at each end of the holder member such that products which are transported in two rows on their travel path can be picked up together and delivered into the container simultaneously.

A case packer having both a discharging device as described above as well as a device for arranging products in two rows has a longer path of transportation and is expensive to set up.

SUMMARY OF THE INVENTION

It is therefore an object of this invention to provide a case packer which, having both a device for arranging products in two rows and a device for discharging defective products, is neither excessively large nor costly to produce.

A case packer embodying this invention, with which the above and other objects can be accomplished, may be characterized as comprising an inspection unit, a packing unit and a sorting unit. The inspection unit is disposed on the upstream side of a path of transportation for transporting packaged products and inspects conditions of the products being transported on the path and thereby distinguishes defective products from normal products. The packing unit is disposed on the downstream side and packs a container simultaneously with products delivered to it in a plurality of rows. The sorting unit is disposed between the inspection unit and the packing unit and discharges the defective products away from the normal path of transportation but serves to arrange the normal products in the plurality of rows.

The sorting unit preferably includes a plurality of quasi-circular members with a straight edge. They are rotatable in a plane perpendicular to the path in both directions from a retracted position at which they do not protrude into the path of their transportation but they serve to discharge each of defective products by rotating in one direction. The normal products are arranged in two row as these quasi-circular members either remain in their retracted position or rotate in the opposite direction to push the product transversely to the path of transportation.

According to a preferred embodiment, the inspection unit includes a length sensor for measuring the length of products being transported, and the sorting unit is operated for a variable length of time for discharging the defective products, depending on the length of the product detected by the length sensor.

According to a still preferred embodiment of the invention, a reset program is provided whereby the case packer is made to operate continuously for a specified period of time when starting up so as to discharge all products remaining on their path of transportation. In the meantime, the sorting unit continuously discharges the products on the upstream side of the sorting unit.

With a case packer thus structured, the sorting unit can single-handedly discharge defective products away from the path of transportation and at the same time arrange normal products in two or more rows. Thus, a large packer is not necessary to achieve these processes according to this invention. The use of quasi-circular members for this purpose can keep the size of the packer reasonably small. With the packer controlled as described above, furthermore, the packer operation can be started easily and the reset time can be reduced significantly.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIG. 1 is a schematic side view of a case packer embodying this invention for showing its overall structure;

FIG. 2 is a schematic plan view of the case packer of FIG. 1 for indicating paths of travel by the products;

FIG. 3 is an enlarged side view of the interior of an upstream end portion of the case packer of FIG. 1;

FIG. 4 is a partially sectional plan view of the sorting unit of the case packer of FIG. 1;

FIG. 5 is a sectional view taken along line 5—5 of FIG. 4;

FIG. 6 is a back view of the sorting unit of FIGS. 4 and 5;

FIG. 7 is a side view of a central portion of the aligning unit of the case packer of FIG. 1;

FIG. 8 is a view taken along line 8—8 of the packing unit of the case packer of FIG. 1; and FIG. 9 is a block diagram of a control unit of the case packer of FIG. 1 for controlling the transportation of products from the moment they are received by the weighing unit until they are delivered into the packing unit.

DETAILED DESCRIPTION OF THE INVENTION

As shown in FIGS. 1 and 2, a case packer 1 according to this invention may be broadly characterized as comprising a weighing unit 2, an inspection unit 3, a sorting unit 4, an aligning unit 5 and a packing unit 6 for automatically filling a container such as a cardboard box Y efficiently and at a high density with packaged products X such as potato chips having a specified weight and sealed in a bag. The weighing unit 2 is not only for transporting packaged articles X dropped, say, from a bag maker-packaging machine (not shown) in a specified general direction of transportation indicated by arrow A but also for weighing the received products X. The inspection unit 3 is for transporting the weighed products X received from the weighing unit 2 along an upwardly sloped path while inspecting the seal condition of the bags and measuring their lengths. The sorting unit 4 is for discarding those of the products X determined to be defective by the inspection unit 3 to the left, as indicated by arrow B, and allowing those determined to be normal to proceed further in the downstream direction but in two rows, some proceeding straight as indicated by arrow C, while the others by being displaced to the right as indicated by arrow D. The aligning unit 5 is for aligning a specified number of products X in each of the two rows in which they are received from the sorting unit 4 such that their edge parts sequentially overlap in the direction of their transportation and transporting them in two rows and in their sequentially overlapped and aligned condition into the packing unit 6. The packing unit 6 is for picking up the group of products X received in two rows from the aligning unit 5, each row containing a specified number of mutually overlapping products X, and packing them at a high packing density into a cardboard box Y which has been independently brought into the packing unit 6 on a box conveyor 56.

As shown more in detail in FIG. 3, the weighing unit 2 includes a first conveyor 21 and a second conveyor 22. The first conveyor 21 is for receiving the products X sequentially dropped thereonto through a chute 21h and transporting them in the direction of transportation A. The second conveyor 22 is disposed on the downstream side of the first conveyor 21 and serves to transport the products X in a somewhat upward direction. Each conveyor 21 or 22 is provided with a pair of rollers 21b and 21c or 22b and 22c rotatably supported by a supporting frame 21a or 22a, an endless belt 21d or 22d which may be a timing belt stretched therebetween, and a drive motor 21f or 22f attached to the support frame 21a or 22a and serving to drive the roller 21c or 22c through a transmission belt 21e or 22e.

The support frame 21a of the first conveyor 21 is attached to a bracket 21g set on a base 23 affixed to the weighing unit 2 through a support shaft 21c' of the roller 21c such that the first conveyor 21 can be swung around the support shaft 21c' and that the height of its upstream end can be properly adjusted according to the dimensions of the bag maker-packaging machine from which the products X are supplied.

The support frame 22a of the second conveyor 22 is attached to the same base 23 as explained above through a leg member 22g. Although not shown in FIG. 2, a weighing device (indicated by numeral 24 in FIG. 9) which may comprise a load cell is provided inside the support frame 22a such that the weight of the product X being transported on its belt 22d can be measured.

The inspection unit 3 includes a third conveyor 31 comprising a pair of rollers 31b and 31c rotatably supported by a support frame 31a, an endless belt 31d which may be a timing belt stretched between these rollers 31b and 31c, and a drive motor 31f for driving the roller 31c through a transmission belt 31e. The support frame 31a is affixed to brackets 32 and 33 set inside the inspection unit 3.

The inspection unit 3 also includes an evening device 34 and a seal checker 35 disposed in this order along the transportation path of the products. The evening device 34 is for making the height of the products X even while they are being transported on the third conveyor 31, and the seal checker 35 is for detecting defectively sealed bags. The evening device 34 and the seal checker 35 are structured alike, each comprising L-shaped linking members 34a or 35a rotatably supported by the support frame 31a around support shafts 34a' or 35a' , a compression plate 34b or 35b and a cylinder device 34d or 35d. The compression plates 34b and 35b are each rotatably supported at a top end part of the linking members 34a or 35a and disposed above the belt 31d. The cylinder devices 34d and 35d are each rotatably supported by the frame 31a around a support shaft 34d' or 35d', having a piston rod 34c or 35c rotatably connected to the lower end part of the linking member 34a or 35a. As the compression plates 34b and 35b are moved up and down, the linking members 34a and 35a swing around the support shafts 34a' and 35a' such that the piston rods 34c and 35c can move outward and inward.

The compression plates 34b and 35b are normally biased downward with a specified pressure by the cylinder devices 34d and 35d. The compression plate 34b of the evening device 34 makes use of this downward force to make even the height of the products X being transported on the third conveyor 31. The cylinder device 35d of the seal checker 35 is provided with a linear encoder 35e for detecting the displacement of its piston rod 35c and thereby detecting products with defective sealing as they are being transported on the third conveyor 31.

Protective plates 25 and 36 are provided next to the second conveyor 22 of the weighing unit 2 and the third conveyor 31 of the inspection unit 3 in order to prevent the products X from falling down. Near the entrance to the seal checker 35 on the protective plate 36 for the inspection unit 3 is a product length sensor 37 for detecting the passing of each product X such that its length can be determined from the time it takes to pass in front of the sensor 37.

As shown in FIGS. 4, 5 and 6, the sorting unit 4 has a rectangular frame 41 with an open upper surface, set, as shown in FIG. 1, on a base structure la of the case packer 1. Many mutually parallel rollers 42 are rotatably supported thereby at elevated positions, protruding slightly upward through upper openings 41a of the frame 41 to define a surface for transporting the products X thereon.

Below these rollers 42 is a shaft 43 rotatably supported by the frame 41 perpendicularly to the rollers 42. A drive motor 44 is set inside the frame 41 through a bracket 44a, and an endless timing belt 44d is stretched between a pulley 43a on this shaft 43 and the drive shaft 44b of this motor 44. Power-communicating ropes 42b are wound between circumferentially formed grooves 42a on the rollers 42 and the shaft 43 such that the rotary motion of the drive shaft 44b of the motor 44 is communicated to each of the rollers 42 through these ropes 42b, causing the product X delivered from the inspection unit 3 onto these rollers 42 to be transported further in the downstream direction indicated again by arrow A. The inspection unit 3 and the sorting unit 4 are so positioned with respect to each other that the product X delivered from the inspection unit 3 will be deposited on the upper left-hand side of the sorting unit 4 with reference to FIG. 4, and indicated by numeral 40 in FIG. 2.

Directly below the rollers 42 is a set of three shafts 45 rotatably supported by the frame 41 perpendicularly to the rollers 42, that is, in the direction of motion A of the products X and on the left-hand side of the rollers 42 as seen in the direction of arrow A. A drive motor 46 therefor is attached to the inner surface of the back wall 41b of this sorting unit 4 on its downstream side. The back ends of these three shafts 45 and the tip of the drive shaft 46a of this drive motor 46 all penetrate and protrude from the back surface of this back wall 41b of the sorting unit 4, and an endless timing belt 48 is stretched over pulleys 45a and 46b attached to these backwardly protruding parts of the shafts 45 and 46a as well as a tension pulley 47 such that the rotary motion of this drive motor 46 can be communicated to the three shafts 45.

A plurality (five in this example) of sorting members 49 are provided where delivered products from the inspection unit 3 are deposited on the rollers 42, that is, on the upper left-hand part as seen in FIG. 4 and indicated by numeral 40 in FIG. 2. Each of these sorting members 49 is quasi-circular, having the shape of a circle with a smaller portion thereof removed along a straight line 49a (and hence is larger than a semi-circle), and is mounted to one of the three shafts 45 through the center. They are so designed that, when the shafts 45 are rotated and their straight edges 49a are horizontal above the shafts 45 (as shown by solid lines in FIG. 4), they are in a retracted position and do not protrude above the surface of transportation by the rollers 42. If the shafts 45 are rotated from this retracted position in the direction shown by arrow B or D shown in FIGS. 4 and 5, the sorting members 49 protrude above the rollers 42 as shown by broken lines in FIG. 5.

With the sorting unit 4 thus structured, the product X delivered from the inspection unit 4 is transported directly in the direction of arrow A (or as indicated by arrow C) if the sorting members 49 are in their retracted positions. If the shafts 45 are rotated to the left or to the right from the retracted position as a product X is transported on the rollers 42, the product X is lifted by the circular edge parts 49b from the upper surfaces of the rollers 42 and pushed transversely as indicated by arrow B or D by the rotary motion of the sorting members 49. If the product X is pushed in the direction of arrow B, it is discharged onto a discharge conveyor 8 shown in FIG. 2. If the product X is pushed in the direction of arrow D, it remains on the rollers 42 and travels parallel to those which travel straight over the rollers 42.

The aligning unit 5, as shown in FIGS. 1, 2 and 7, includes a total of three (first, second and third) support frames 51a, 52a and 53a set along the direction of motion A of the products X on the base structure 1a of the case packer 1. The first support frame 51a supports thereon a first conveyor 51 which is slightly upwardly sloped, and the second support frame 52a supports thereon a second conveyor 52 and a third conveyor 53 which are also slightly upwardly sloped and somewhat shorter than the first conveyor 51. The third support frame 53a includes a fourth conveyor 54 which extends horizontally into the packing unit 6. As will be explained below, the fourth conveyor 54 of the aligning unit 5 serves also as a product supplying conveyor in the operation of the packing unit 6 and hence will also be referred to as "the product supplying conveyor 54" in connection with the packing operations inside the packing unit 6.

These four conveyors 51–54 of the aligning unit 5 are all structured similarly as described above for the conveyors 21, 22 and 31 of the weighing unit 2 and the inspection unit 3. Their structure will be described for the completeness of disclosure, but only very briefly. As shown in FIGS. 1 and 7, pairs of rollers 51b, 51c, 52b, 52c, 53b, 53c, 54b and 54c are rotatably supported each by corresponding one of the support frames 51a, 52a and 53a, and belts 51d, 52d, 53d and 54d which may be endless timing belts are stretched thereover. Drive motors 51f, 52f, 53f and 54f each attached to corresponding one of the support frames 51a, 52a and 53a communicate their rotary power through power communicating means shown at 51e, 52e, 53e and 54e in FIGS. 1 and 7.

The end on the upstream side of the second conveyor 52 is disposed below the end on the downstream side of the first conveyor 51 such that the products X delivered by the first conveyor 51 will be dropped onto the second conveyor 52 to be transported in the general direction of motion shown by arrow A.

A discharge timing sensor 55 is disposed near the downstream end part of the first conveyor 51, as shown in FIG. 7. The discharge timing sensor 55 is similar to the product length sensor 37 explained above with reference to the inspection unit 3. The discharge timing sensor 55 serves to detect the passing of the rear end of each product X for determining the timing of its dropping from the first conveyor 51. It is preferred that each of the drive motors 51f, 52f, 53f and 54f be a servo motor of which the rotation can be controlled by the number of output pulses.

The packing unit 6 according to this invention will be described next with reference to FIG. 8, as comprising a housing 61, a swinging elongated member referenced herein as "the arm 63", a servo motor 62 for its rotary motion, support members 64, suction pads 65 attached in pairs at both ends of the arm 63, a first elevator mechanism 66 and a second elevator mechanism 67. More in detail, the housing 61 includes a top wall 61a and a pair of side walls 61b and 61c to enclose therein the product supplying conveyor 54 (referred to above as "the fourth conveyor" of the aligning unit 5) and another conveyor 56 (herein referred to as "the box conveyor") disposed parallel thereto for transporting containers such as cardboard boxes Y. The servo motor 62 is affixed at an elevated position inside the housing 61 and its drive shaft 62a undergoes a reciprocating angular motion of 180° intermittently. The arm 63 is affixed to the drive shaft 62a of the servo motor 62 so as to rotate reciprocatingly in a horizontal plane between a first position above the product supplying conveyor 54 and a second position above the box conveyor 56 for transporting containers. The support members 64 are vertically elongated and supported by the arm 63 at its both ends so as to be movable vertically upward and downward. Two of the suction pads 65 are attached to the bottom part of each of the support members 64 for sucking up the products X at a specified pick-up position on the product supplying conveyor 54 and releasing them at a specified drop-off position. The first elevator mechanism 66 is for engaging selectively with the support members 64 above the pick-up position and moving them vertically upward and downward. The second elevator mechanism 67 is for engaging with the support members 64 above the specified drop-off position and moving them vertically upward and downward.

A blower 68 is disposed below the product supplying conveyor 54. Flexible pipes 68a are attached thereto and extend to the support members 64 to be connected to the suction pads 65 such that the products x brought to the pick-up position can be sucked up. Because the suction pads 65 are provided at both end parts of the elongated arm 63 opposite from each other with respect to its axis of rotation, products X can be picked up from the product supplying conveyor 54 and deposited in a box Y on the box conveyor 56 at the same time as the arm makes a one-half turn around its axis of rotation. Because the products X are brought into the packing unit 6 in two rows and picked up by the suction pad 65 while remaining arranged in two rows, the packing of the box can be effected more efficiently according to this invention.

The portion of a control unit for the case packer 1 for controlling the transportation of products X from its weighing unit 2 to the packing unit 6 is schematically shown at 7 in FIG. 9. Thus, the control unit 7 receives weight signals from the weighing device 24 of the weighing unit 2, inspection signals from the seal checker 35 and length signals from the product length sensor 37, and timing signals from the discharge timing sensor 55 of the aligning unit 5 and, on the basis of these received signals, outputs drive signals to the drive motors 21f and 22f of the weighing unit 2, the third drive motor 31f of the inspection unit 3, the motor 44 of the sorting unit 4, the servo motor 46 and each of the four drive motors 51f, 52f, 53f and 54f of the aligning unit 5 such that defective products are discarded off the path of transportation and a specified number of only normal products are aligned with their front and back edges overlapped by a specified distance and delivered to the packing unit 6.

Next, the control operations by the control unit 7 will be explained more in detail.

After each packaged product X is delivered to the upstream end of the weighing unit 2, it is transported by its first conveyor 21 to the second conveyor 22 on the downstream side. The second conveyor 22 stops momentarily to have the product x weighed by the weighing device 24 provided inside the second conveyor 22 and then starts its motion again to deliver the weighed product X to the inspection unit 3. Although not shown in the figures, there is a third sensor, similar to the product length sensors 37 of the inspection unit 3 and the discharge timing sensor 55 of the aligning unit 5, for detecting the presence of a product at the position of the weighing device 24, serving to cause the control unit 7 to stop the drive motor 22f for the second conveyor 22 when this sensor detects the arrival of a new product X at the position of the weighing device 24 and to restart its motion when the weight signal from the weighing device 24 stabilizes.

The product X delivered to the inspection unit 3 is transported by its third conveyor 31 to the sorting unit 4. In the meantime, its shape is made even by the compression plate 34b of the evening device 34 provided along the path of transportation, and the condition of its sealing is checked by the seal checker 35. The length of the product x is calculated by the control unit 7 by measuring the time it takes to pass the product length sensor 37. It is to be noted that the product length sensor 37 is near the entrance to the seal checker 35 but it is designed such that if a product X with a normal length enters the seal checker, its front end will be still on the third conveyor 31 of the inspection unit 3 and will have not reached the sorting members 49 of the sorting unit 4 as of the time when its rear end is detected by the product length sensor 37. Thus, the product X is delivered to the delivery position 40 of the sorting unit 4 only after it has been determined whether its length is normal or not.

The control unit 7 also serves to observe the position of the piston rod 35c by the encoder 35e from the moment when a product X enters the seal checker 35 and its front end is detected by the product length sensor 37 until a specified approximate length of time required for the product X to entirely come inside the seal checker 35, determining whether the displacement value is over a specified value or not. If the displacement value is less than the specified value, the control unit 7 concludes that the bag has no leak. If otherwise, it concludes that the product x is defective. In this control, it is preferable to set this length of time equal to the time required for the front end of the product X to reach the sorting members 49 of the sorting unit 4 so as to prevent a delay in the response in the sorting operation against a product which may be normal in length but is determined defective by this test.

The product X delivered from the inspection unit 3 to the delivery position 40 of the sorting unit 4 is further transported in the downstream direction by the rollers 42. Those products X determined to be normal by the time they were delivered to the sorting unit 4 are separated into two rows on the rollers 42 but those determined to be defective are discarded away from the path of transportation. Initially, the control unit 7 not only activates the drive motor 44 to cause the rollers 42 to rotate but also controls the servo motor 46 such that the sorting members 49 are in their retracted base positions, without protruding above the top surfaces of the rollers 42. For a defective product, whether due to its weight measured by the weighing device 24, due to a leak in the bag detected by the seal checker 35 or due to its incorrect length detected by the product length sensor 37, the control unit 7 controls the servo motor 44 such that the sorting members 49 will turn to the left from their retracted positions, thereby lifting the incoming defective product and moving it transversely to the left to discharge it onto the discharge conveyor 8 away from its normal path of transportation to the aligning unit 5. For products determined to be normal regarding all these test results, the control unit 7 alternates the action of keeping the sorting members 49 in their retracted base positions so as to allow the products to go straight as indicated by arrow C and the action of rotating the sorting members 49 from their retracted positions to the right as indicated by arrow D. As a result, normal products are divided into two mutually parallel rows, as shown in FIG. 2, and delivered into the aligning unit 5 on the downstream side. In summary the products X received by the sorting unit 4 are separated in three directions B, C and D, depending upon whether they are defective or normal.

The rotary motion of the sorting members 49 is adjusted so as to start at the time of discharge of the product X onto the sorting unit 4, calculated from the time when the product X passed the product length sensor 37.

The angle by which the sorting members 49 are rotated to push a product in the directions indicated by arrow B and D is varied by the control unit 7 according to the measured length of the defective product to be discharged. Thus, if the product to be discharged has a short bag length, the sorting members 49 are rotated by a smaller angle. If the product to be discharges is longer, the angle of rotation of the sorting members 49 is increased accordingly, or they can even be made to rotate repeatedly. This control can respond to situations when an error in the bag maker-packaging machine, for example, results in a product packaged in an abnormally long bag. The angle of rotation of the sorting members 49 is calculated on the basis of the length of the product measured by the product length sensor 37.

The normal products X delivered from the sorting unit 4 to the aligning unit 5 in two rows are made into groups of a specified number in each of the rows, aligned such that they overlap in the direction of transportation by a specified length and delivered further downstream to the packing unit 6.

Regarding the aligning unit 5, the control unit 7 activates its first conveyor 51 to transport the incoming products X sequentially, dropping them onto the upstream end of the second conveyor 52. The number of products X in each row thus dropped onto the second conveyor 52 is monitored by the timing sensor 55, and when a specified number of products X have been dropped in either of the rows, the servo motor 51f for the first conveyor 51 is stopped. In this operation, the timing for the stopping of the first conveyor 51 is determined by calculating the time of travel after the last of the specified number of products X is detected by the timing sensor 55. As the servo motor 51f for the first conveyor 51 is thus stopped, all the drive motors on the upstream side are also stopped such that the products x will not be overlapped on their path of transportation.

The servo motors 52f and 53f for the second and third conveyors 52 and 53 are activated intermittently, as explained above, moving the second and third conveyors 52 and 53 intermittently by a specified distance every time a product X is dropped onto the second conveyor 52 from the first conveyor 51. In other words, these conveyors 52 and 53 are moved forward every time products X of the same order in the two rows are dropped from the first conveyor 51. If the products of the same order in two rows are not abreast of each other and are dropped at different times, the intermittent motion of the two conveyors 52 and 53 will be started after the second of the two products of the same order is dropped and discharged. This specified distance is, as shown in FIG. 7, shorter by m than the length of the bags for the products X. This is repeated until the specified number of products X dropped from the first conveyor 51 are aligned in each of the two rows in a mutually overlapped group as shown in FIG. 7.

When the last of the group of products X in each row has been thus overlappingly aligned, the control unit 7 causes the second and third conveyors 52 and 53 to move in a continuous motion to deliver these groups in two rows of mutually overlapped products X all at once onto the fourth conveyor 54. The servo motor 54f for the fourth conveyor 54 is controlled such that the products X in two rows thereon are carried to the specified pick-up inside the packing unit 6.

During this continuous motion of the groups of products X onto the fourth conveyor 54, the control unit 7 switches the mode of operation of the second conveyor 52 from continuous to intermittent as soon as the rear end of this group of products X clears the second conveyor 52 and passes onto the third conveyor 53. By this manner of control, the aligning unit 5 can start receiving the next group of products X from the sorting unit 4, without waiting until the entire group of the products x is discharged onto the fourth conveyor 54. It now goes without saying that this improves the efficiency of operation of the case packer 1 as a whole.

According to a still more improved mode of control, the intermittent mode of movement of the second conveyor 52, as well as the delivery of products X from the first conveyor 51, may be restarted without waiting until the rear end of the preceding group of products X passes onto the third conveyor 53. It may be started when there is only the last one of the preceding group of products left on the second conveyor 52 such that this last product of the preceding group will be discharged onto the third conveyor 53 in the next cycle of the intermittent motion of the second conveyor 52, together with the first product X of the next group to be formed. This can improve the overall efficiency of the case packer I even more.

Another characteristic control by the control unit 7 will be described next.

As should be clear from the description given above, the case packer 1 according to this invention carries out many processes on the products while transporting them into its packing unit 6. Thus, the control unit 7 not only receives many kinds of data which are necessary for the control but also must store them and control the transportation of the products X based on these stored data. If the control unit 7 is shut down by a power failure, for example, these stored data are normally destroyed, and it becomes impossible to restart the operation of the case packer 1 as a whole. The operator will then be required to manually remove all the products remaining on their path of transportation such that the transportation process can be started from the beginning.

According to a preferred embodiment of this invention, the control unit 7 is programmed to operate all conveyors of the units 2, 3, 4 and 5 continuously for a specified length of time at the start-up of the case packer 1 such that all products X remaining on the path of transportation at the time will be discharged. In the meantime, the sorting members 49 of the sorting unit 4 are rotated continuously in the direction of arrow B such that all products X on the upstream side of the sorting unit 4 will be discharged onto the discharge conveyor 8. Those which have already been inspected and determined to be normal are discharged onto another discharge conveyor 9 disposed further downstream to the packing unit 6, as shown in FIG. 2, although those which have not been inspected yet are separately discharged together with those determined to be defective. In other words, the products remaining on the path of transportation are collected at different places, depending on their classifications. This improves the efficiency of operation and reduces the reset time of the case packer 1 as a whole.

Although the invention was described above with reference to only one embodiment, this embodiment is not intended to limit the scope of the invention. All modifications and variations of the description give above, which may be apparent to a person skilled in the art, are intended to be within the scope of this invention.

What is claimed is:

1. A case packer comprising:
an inspection unit disposed on an upstream side of a path of transportation for packaged products for inspecting each of said products being transported on said path and thereby distinguishing defective products from normal products;
a packing unit disposed on an downstream side of said path for packing a specified container simultaneously with products delivered thereto in a plurality of rows on said path; and
a sorting unit disposed between said inspection unit and said packing unit along said path for discharging said defective products away from said path and arranging said normal products in said plurality of rows on said path.

2. The case packer of claim 1 wherein said sorting unit includes a plurality of quasi-circular members each with a circular shape with a smaller portion removed along a straight edge so as to leave a larger portion than said smaller portion to serve as said quasi-circular member, said quasi-circular members is rotatable in a plane perpendicular to said path in both directions from a retracted position at which said quasi-circular members do not protrude into said path, said quasi-circular members discharges each of said defective products by rotating in one direction in said perpendicular plane, and said quasi-circular members arrange said normal products in said plurality of rows by remaining in said retracted position to thereby allow said normal products to move straight and rotating oppositely to said one direction to thereby move said normal products transversely to said path.

3. The case packer of claim 1 wherein said inspection unit includes a length sensor for measuring the length of products being transported on said path, and said sorting unit is operated for a variable length of time depending on the length detected by said length sensor for discharging said defective products.

4. The case packer of claim 2 wherein said inspection unit includes a length sensor for measuring the length of products being transported on said path, and said sorting unit is operated for a variable length of time depending on the length detected by said length sensor for discharging said defective products.

5. The case packer of claim 1 which runs a reset program by continuously operating for a specified period of time when starting up so as to discharge all of said products remaining on said path, said sorting unit continuously discharging away from said path those of said products on the upstream side of said sorting unit while said reset program is run.

6. The case packer of claim 2 which runs a reset program by continuously operating for a specified period of time when starting up so as to discharge all of said products remaining on said path, said sorting unit continuously discharging away from said path those of said products on the upstream side of said sorting unit while said reset program is run.

7. The case packer of claim 3 which runs a reset program by continuously operating for a specified period of time when starting up so as to discharge all of said products remaining on said path, said sorting unit continuously discharging away from said path those of said products on the upstream side of said sorting unit while said reset program is run.

8. The case packer of claim 4 which runs a reset program by continuously operating for a specified period of time when starting up so as to discharge all of said products remaining on said path, said sorting unit continuously discharging away from said path those of said products on the upstream side of said sorting unit while said reset program is run.

* * * * *